Patented Oct. 5, 1943

2,330,943

UNITED STATES PATENT OFFICE 2,330,943

WELDING

Philip P. Anderson, Jr., and Ralph M. Major, Evansville, Ind., assignors to Servel, Inc., New York, N. Y., a corporation of Delaware No Drawing. Application November 28, 1941, Serial No. 420,840

2 Claims. (Cl. 219—10)

This invention relates to electrical resistance welding.

An object of the invention is to provide a novel and improved method for welding copper or copper alloys by resistance welding.

Various other objects and advantages will become apparent as the nature of the invention is more fully disclosed.

Although the novel features which are believed to be characteristic of this invention are pointed out more particularly in the claims appended hereto, the invention itself may be better understood by referring to the following description, in which a specific embodiment thereof has been set forth for purposes of illustration.

In a specific embodiment, this invention may be applied to spot-welding copper fins to a copper tube of the type, for example, embodied in absorbers of absorption refrigeration systems. It has been found that usual welding or soldering methods tend to distort the tubes and leave the same in a soft condition. The high electrical and thermal conductivity of copper makes electrical resistance welding particularly unsatisfactory due to the difficulty of producing and concentrating the heat at the point required for welding. The present invention overcomes these difficulties and makes it possible to unite metals of the above type by usual methods of welding.

In accordance with the present invention, it has been found that copper objects, or objects made of copper alloys such as brass or bronze, having high thermal or electrical conductivity or both and which are, therefore, difficult to unite by ordinary methods of welding, may be readily united when coated, in the regions to be welded, with an adherent layer of iron. The iron coating is electrodeposited on the surface of the base metal to form a highly bonded adherent layer of uniform thickness.

When thus coated, the object may be readily welded to a ferrous surface using the usual electrical resistance welding technique. The surface coating increases the electrical resistance of the material to a sufficient extent to generate and concentrate the heat at the point required and also provides a readily weldable surface material. The heat required for this purpose does not serve to distort or damage the object itself or to render the same soft.

Applying this invention specifically to welding copper fins to copper tubes, for example, the surfaces of the fins and tubes to be welded are first cleaned in any suitable manner to condition the same to receive an electroplate. They are then immersed as a cathode in an electrolyte and iron is deposited thereon electrolytically in the usual manner. The electrolyte may, for example, comprise iron in the form of ferrous ammonium sulphate and sulphuric acid and may be adjusted for operation at a current density of about 50 amperes per sq. ft. to obtain an iron coating of about .001 inch in thickness and of desired porosity. This coating, the resistivity of which is determined by the porosity, is firmly bonded to the copper surface and is well suited to welding.

The materials thus plated are cleaned and dried in the usual manner and are then welded by using standard resistance welding technique in which the pieces are placed against each other with the iron coatings contacting each other, and passing welding current between the pieces and through the iron coatings. It has been found that the surface coatings readily fuse and may be joined in the above manner without distortion. If the fins, for example, are made of iron or the other ferrous metals, they may be welded directly to the iron coated copper tube without being coated with electrolytic iron.

Although a specific embodiment of the invention has been described for purposes of illustration, it is to be understood that the invention is not to be restricted thereto but is only to be limited in accordance with the scope of the following claims.

We claim:

1. A method of welding pieces of copper, which comprises forming by electro-deposition on a surface of each of said pieces a coating of iron of uniform thickness, the current density while forming such iron coatings by electro-deposition being adjusted to produce coatings of desired porosity, which thereby determines the resistivity of said iron coatings, placing said pieces against each other with said iron coatings contacting each other, and passing welding current between said pieces and through said iron coatings for resistance welding.

2. A method of welding a piece of copper to another piece of metal having a ferrous surface thereon, which comprises forming by electro-deposition on a surface of said copper piece a coating of iron of uniform thickness, the current density while forming such iron coating by electro-deposition being adjusted to produce a coating of desired porosity, which thereby determines the resistivity of said iron coating, placing said pieces against each other with said iron coating contacting the ferrous surface on said other piece of metal, and passing welding current between said pieces and through said iron coating and ferrous surface for resistance welding.

PHILIP P. ANDERSON, Jr.,
RALPH M. MAJOR.